(12) United States Patent
Nick

(10) Patent No.: US 12,080,906 B2
(45) Date of Patent: Sep. 3, 2024

(54) POWER TOOL BATTERY PACK RECEPTACLE

(71) Applicant: MILWAUKEE ELECTRIC TOOL CORPORATION, Brookfield, WI (US)

(72) Inventor: Mackenzie J. Nick, Fond du Lac, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 121 days.

(21) Appl. No.: 17/574,205

(22) Filed: Jan. 12, 2022

(65) Prior Publication Data

US 2022/0223966 A1 Jul. 14, 2022

Related U.S. Application Data

(60) Provisional application No. 63/136,274, filed on Jan. 12, 2021.

(51) Int. Cl.
| | |
|---|---|
| *H01M 50/247* | (2021.01) |
| *H01M 10/6235* | (2014.01) |
| *H02J 7/00* | (2006.01) |

(52) U.S. Cl.
CPC ..... *H01M 50/247* (2021.01); *H01M 10/6235* (2015.04); *H02J 7/0045* (2013.01); *H01M 2220/30* (2013.01)

(58) Field of Classification Search
CPC .......... H01M 50/247; H01M 10/6235; H01M 2220/30
See application file for complete search history.

(56) References Cited

U.S. PATENT DOCUMENTS

| 7,554,287 B2 | 6/2009 | Duesselberg |
| 7,766,097 B2 | 8/2010 | Kondo |

(Continued)

FOREIGN PATENT DOCUMENTS

| CN | 203967149 U | 11/2014 |
| CN | 205996861 U | 3/2017 |

(Continued)

OTHER PUBLICATIONS

International Search Report and Written Opinion for Application No. PCT/US2022/012134 dated Apr. 28, 2022 (10 pages).

*Primary Examiner* — Milton I Cano
*Assistant Examiner* — Albert Michael Hilton
(74) *Attorney, Agent, or Firm* — Michael Best & Friedrich LLP

(57) ABSTRACT

A battery pack receptacle includes a cavity that is defined by a first wall, a second wall, an intermediate wall coupled between the first wall and the second wall, an insertion end, and a closed end opposite the insertion end along an insertion axis of the battery pack. The receptacle includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. A contact surface is defined adjacent the rail, along the lateral wall, or at the insertion end is configured to engage a mating contact surface of the battery pack to tighten the connection between the battery pack and the battery pack receptacle.

20 Claims, 12 Drawing Sheets

(56) References Cited

U.S. PATENT DOCUMENTS

| | | |
|---|---|---|
| 8,123,098 B2 | 2/2012 | Miyata |
| 8,148,000 B2 | 4/2012 | Furuta et al. |
| 8,557,427 B2 | 10/2013 | Matsumoto |
| 9,224,995 B2 | 12/2015 | Martinsson et al. |
| 9,461,281 B2 | 10/2016 | Wackwitz et al. |
| 9,748,534 B2 | 8/2017 | Hanawa et al. |
| 9,774,017 B2 | 9/2017 | Uchida et al. |
| 10,076,833 B2 | 9/2018 | Tada et al. |
| 10,105,832 B2 | 10/2018 | Martinsson et al. |
| 10,232,479 B2 | 3/2019 | Thorson et al. |
| 10,263,228 B2 | 4/2019 | Nishikawa et al. |
| 10,276,844 B2 | 4/2019 | Wackwitz et al. |
| 10,483,506 B2 | 11/2019 | Klee et al. |
| 10,707,458 B2 | 7/2020 | Zahn |
| 2007/0090700 A1* | 4/2007 | Matthias ............ H01M 50/264 173/217 |
| 2012/0171539 A1 | 7/2012 | Rejman et al. |
| 2014/0321034 A1 | 10/2014 | Takeuchi |
| 2015/0328764 A1 | 11/2015 | Yoshikane et al. |
| 2017/0373288 A1 | 12/2017 | Klee et al. |
| 2018/0104802 A1* | 4/2018 | Mergener ............ B23B 45/008 |
| 2018/0169851 A1* | 6/2018 | Radovich ............ H02J 7/0044 |
| 2019/0001477 A1 | 1/2019 | Ullrich et al. |
| 2019/0193223 A1 | 6/2019 | Thorson et al. |
| 2019/0381646 A1 | 12/2019 | Yoshikane et al. |
| 2020/0147771 A1 | 5/2020 | Mergener et al. |
| 2020/0215680 A1 | 7/2020 | Meixner et al. |
| 2020/0227695 A1 | 7/2020 | Jones et al. |
| 2020/0295506 A1 | 9/2020 | Marx et al. |
| 2020/0303933 A1 | 9/2020 | Murakami et al. |
| 2021/0057686 A1 | 2/2021 | Qiao |

FOREIGN PATENT DOCUMENTS

| | | |
|---|---|---|
| CN | 206296837 U | 7/2017 |
| CN | 107492610 A | 12/2017 |
| EP | 2080594 B1 | 4/2013 |
| EP | 3603899 A1 | 2/2020 |
| WO | 2019058933 A1 | 3/2019 |
| WO | 2019170331 A1 | 9/2019 |
| WO | 2020194090 A1 | 10/2020 |

* cited by examiner

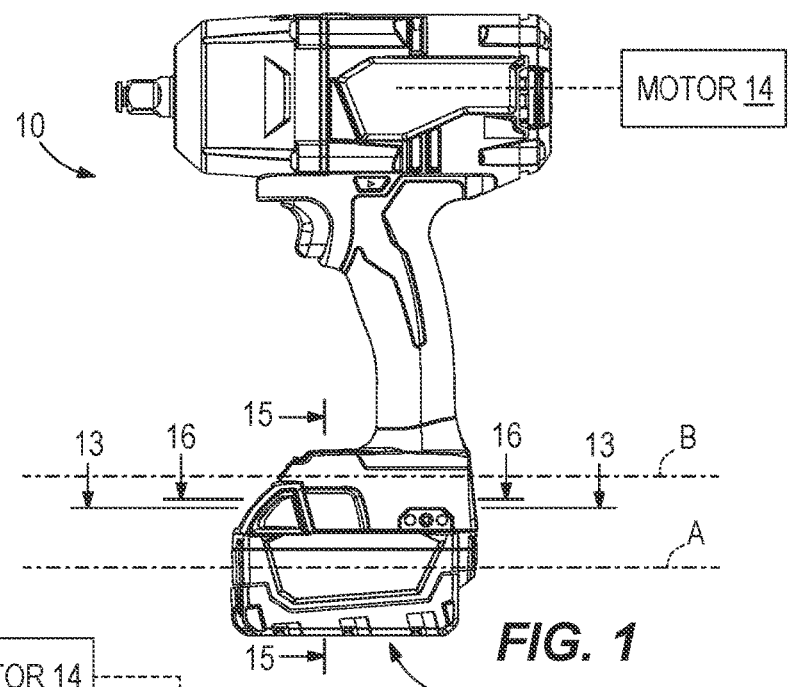
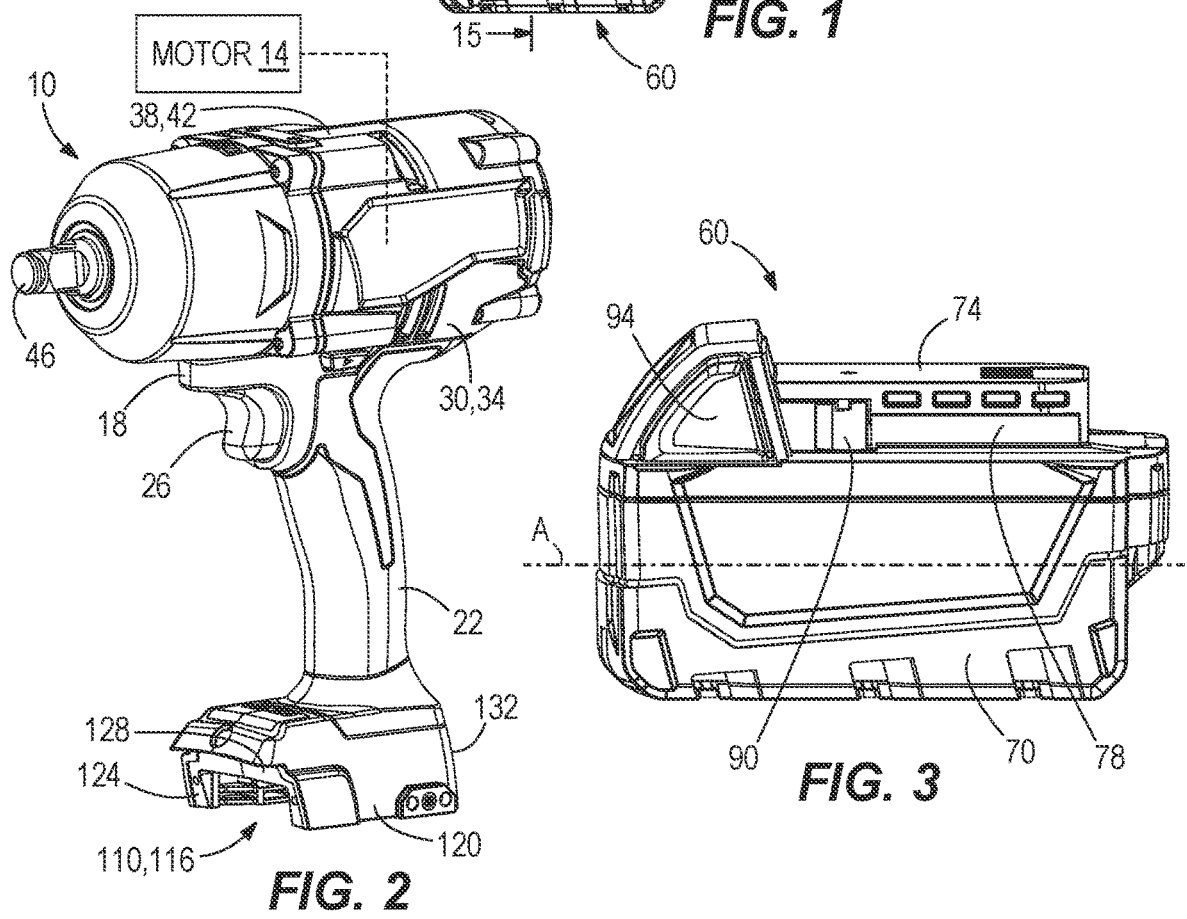

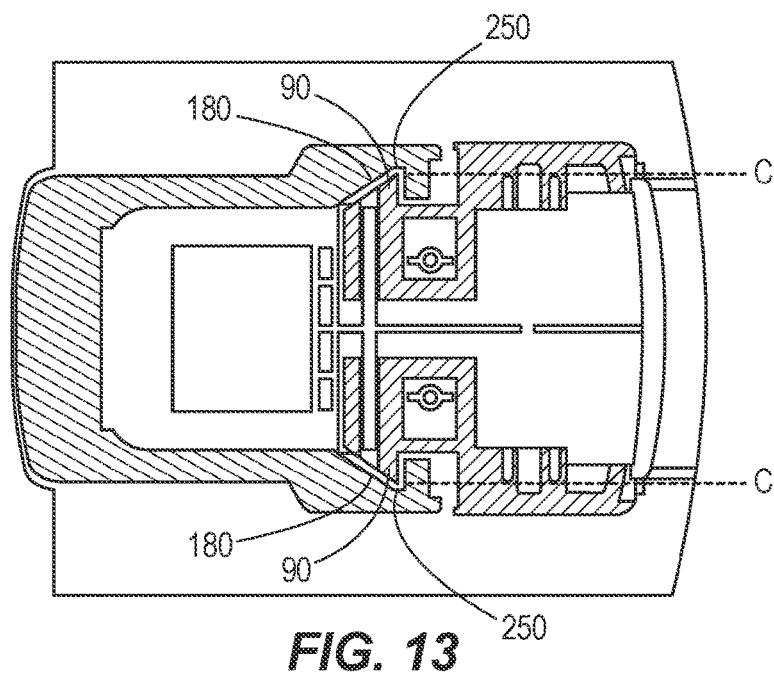
FIG. 13
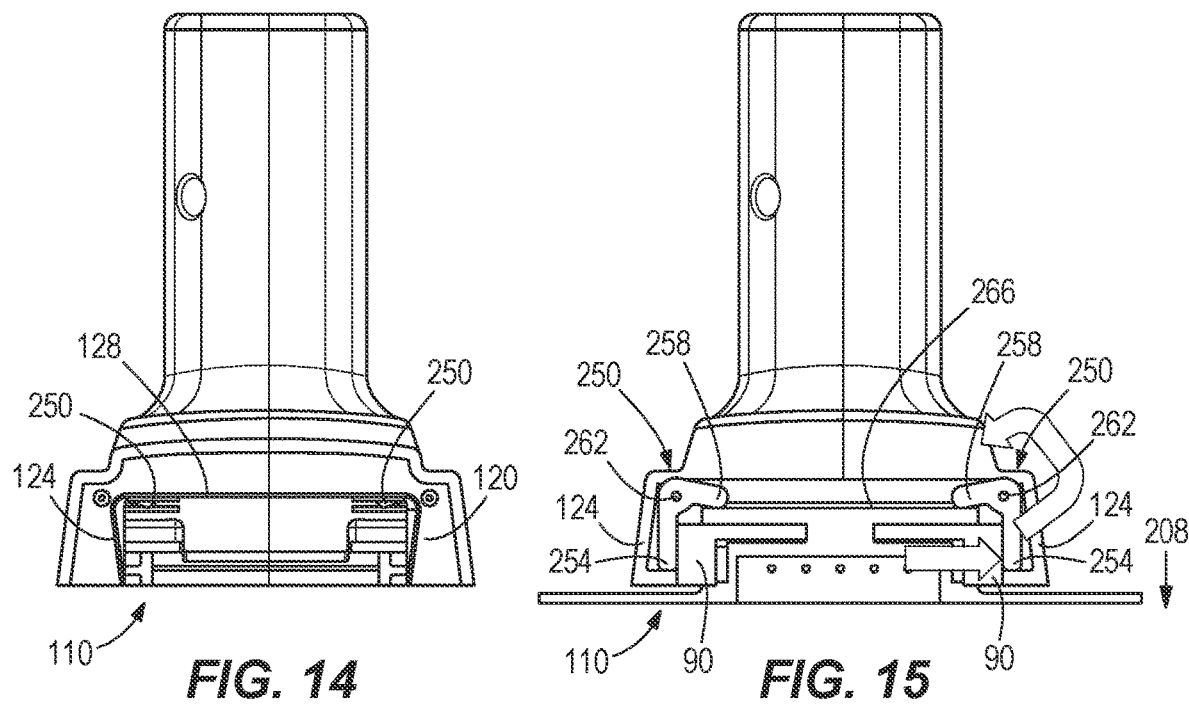
FIG. 14
FIG. 15

POWER TOOL BATTERY PACK RECEPTACLE

CROSS-REFERENCE TO RELATED APPLICATIONS

The present application claims priority to U.S. Provisional Patent Application No. 63/136,274, filed on Jan. 12, 2021, the entire content of which is incorporated herein by reference.

FIELD OF THE DISCLOSURE

The present disclosure relates to a power tools, and more particularly to power tools including a battery pack receptacle for receiving a battery pack.

SUMMARY OF THE DISCLOSURE

Various embodiments discussed herein improve the fit between a battery pack and a battery pack receptacle of a power tool.

In one embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. A contact surface defined adjacent the rail, along the lateral wall, or at the insertion end is configured to engage a mating contact surface of the battery pack to tighten the connection between the battery pack and the battery pack receptacle.

In another embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. The receptacle also includes means positioned with or adjacent the cavity for engaging and clamping one or more surfaces of the battery pack to tighten the connection between the battery pack and the battery pack receptacle.

In another embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. A lever is positioned adjacent the insertion end and pivotally coupled adjacent the first wall for engaging and clamping one or more surfaces of the battery pack to tighten a connection between the battery pack and the battery pack receptacle.

In another embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. A spring-biased insert is positioned adjacent the closed end.

In another embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. One or more deflectable beams are coupled to and extend from the first wall through an opening in the rail. Each of the one or more beams has a free end spaced apart from the first wall, a first tapered surface extending in the direction of the groove, and a second tapered surface extending in the direction of the groove and intersecting the first tapered surface.

In another embodiment, a power tool battery pack receptacle includes a cavity in which a portion of a battery pack is receivable. The cavity is defined in part by a first wall, a second wall, an intermediate wall coupled between the first wall and the second wall, an insertion end, and a closed end opposite the insertion end along an insertion axis of the battery pack. The receptacle further includes a rail coupled to the first wall and extending between the insertion end and the closed end. The rail defines a guide surface. A groove is defined between the intermediate wall and the guide surface of the rail. The groove has a lateral wall coupled between the intermediate wall and the guide surface of the rail. A slug is coupled to and extends from the first wall, the slug being positioned adjacent the closed end.

BRIEF DESCRIPTION OF THE DRAWINGS

FIG. 1 is a side view of a power tool and a battery pack coupled thereto.

FIG. 2 is a perspective view of the power tool of FIG. 1 with the battery pack removed, illustrating an exemplary battery pack receptacle.

FIG. 3 is a side view of the battery pack of FIG. 1.

FIG. 13 is a cross-sectional view of a battery pack receptacle according to one embodiment for the power tool of FIG. 1 and useable with the battery pack of FIG. 1, the cross-section being taken along the ling 13-13 of FIG. 1.

FIG. 14 is a front view of the battery pack receptacle of FIG. 13.

FIG. 15 is a view of the battery pack receptacle of FIG. 13 and the battery pack of FIG. 1 taken along the line 15-15 of FIG. 1.

Figure 4:
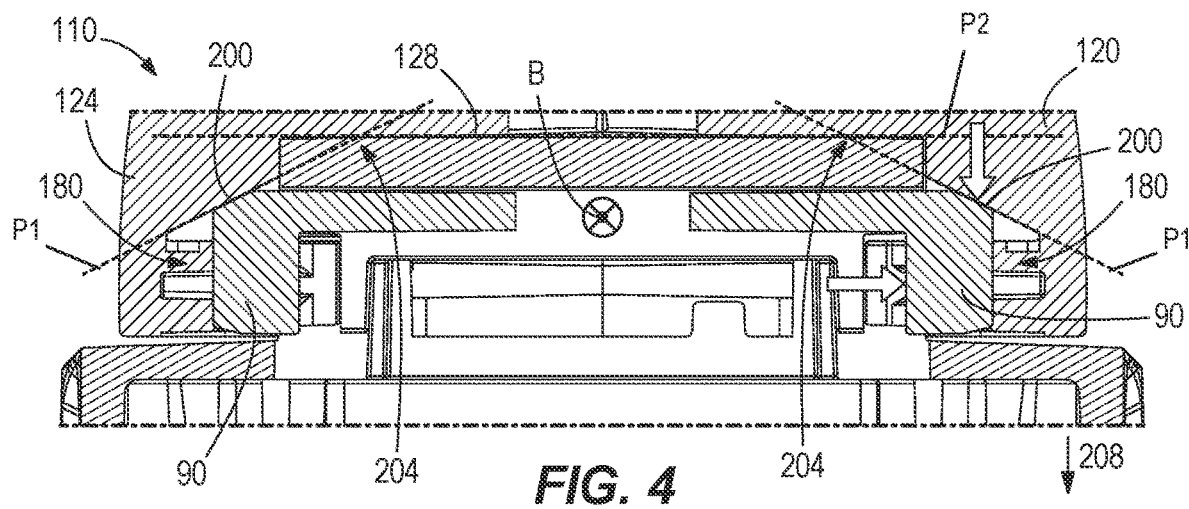
FIG. 4 is a schematic view of a battery pack receptacle according to one embodiment for the power tool of FIG. 1 and for use with the battery pack of FIG. 1.

Before any independent embodiments of the present subject matter are explained in detail, it is to be understood that the present subject matter is not limited in its application to the details of construction and the arrangement of components set forth in the following description or illustrated in the following drawings. The present subject matter is capable of other independent embodiments and of being practiced or of being carried out in various ways. Also, it is to be understood that the phraseology and terminology used herein is for the purpose of description and should not be regarded as limiting.

DETAILED DESCRIPTION

FIGS. 1 and 2 illustrate a power tool 10 including an electric motor 14 (shown schematically in broken lines) located within a housing 18. The housing 18 includes a handle 22 that has an actuator 26 (e.g., a button or trigger) operable to activate the motor 14. In the illustrated embodiment, the housing 22 includes a first housing portion 30 (e.g., a first clamshell half) that defines a first side 34 of the tool 10 and a second housing portion 38 (e.g., a second clamshell half) that defines a second side 42 of the tool 10. The first housing portion 30 is coupled (e.g., by fasteners or the like) to the second housing portion 38 to enclose the motor 14. In other embodiments, the housing 18 may have other suitable configurations. Each housing portion 30, 38 is formed of plastic; however, in some embodiments, the housing portions 30, 38 may be formed of other materials. The handle 22 includes at least one grip surface configured to be grasped by a user. In the illustrated embodiment, the power tool 10 is an impact wrench. When the trigger 26 is actuated, the motor 14 causes a drive mechanism (not shown) to move or rotate a working element 46. The power tool 10 illustrated herein is merely exemplary. In other embodiments, the power tool 10 may be configured as any of number of different tools.

With continued reference to FIGS. 1 and 2, the housing 18 supports and/or retains a battery pack 60, which supplies electrical power to the motor 14. As shown in FIG. 3, in the illustrated embodiment, the battery pack 60 is a slide-on-type battery pack 60 including a housing 70 having a longitudinal axis A and a rail and groove structure on opposite sides of the housing 70. That is, a first rail 74 and a first groove 78 extend along at least a portion of a length of the housing 70 on a first side. Similarly, although not shown, a second rail 74 and a second groove 78 extend along at least a portion of the length of the housing 70 on a second side opposite the first side. Additionally, the battery pack 60 includes a latch mechanism having first and second latches 90 (only one of which is shown) and first and second latch actuators 94 (only one of which is shown). The first latch 90 and the first latch actuator 94 are the first side of the housing 70. Similarly, the second latch 90 and the second latch actuator 94 are the second side of the housing 70. The first and second latch actuators 90 are movable together in a direction toward the longitudinal axis A to move the respective first and second latch 90 between a locking position in which the respective latch 90 extends from the housing 70 and a release position in which the respective latch 90 is at least partially retracted within the housing 70. The battery pack 60 further includes a terminal block (not shown) that is positioned within the housing 70. The terminal block supports battery pack terminals (not shown), each of which is accessible through openings (not shown) in the housing 70.

The terminals are in electrical communication with a plurality of battery cells (not shown) and a battery controller (not shown).

The battery pack 60 may be configured having any of a number of different voltages (e.g., 4 volts, 12 volts, 18 volts, and/or the like) depending upon the range of applications of the power tool 10 and may utilize any of a number of different chemistries (e.g., lithium-ion, nickel-cadmium, and/or the like). The battery pack 60 is also removable from the housing 18 for charging by a separate battery pack charger. The battery pack 60 may also be interchangeable with a variety of other power tools (e.g., saws, flashlights, drivers, and/or the like) to supply power to the power tools.

As shown in FIG. 2, the housing 18 includes a battery pack receptacle 110 that defines a cavity 116 for removably receiving a portion of the battery pack 60. In the illustrated embodiment, the battery pack receptacle 110 is formed with or adjacent the handle 22. The battery pack receptacle 110 includes first wall 120 and a second wall 124 extending from opposite sides of a third intermediate wall 128. A fourth wall 132 is coupled to the third wall 128 and positioned between the first wall 120 and the second wall 124. The fourth wall 124 defines a closed end of the battery pack receptacle 110. A terminal block (not shown) is supported by the third wall 128 adjacent the fourth wall 132. The terminal block includes electrical terminals (not shown) that are configured to mate with the terminals of the battery pack 60. An insertion end of the battery pack receptacle 110 is positioned opposite the fourth wall 132. The cavity 116 defines an insertion axis B between the first wall 120 and the second wall 124 (FIG. 1).

As shown in FIG. 2, the first housing portion 30 defines a first side of the battery pack receptacle 110 and the second housing portion 38 defines a second side of the battery pack receptacle 110. Accordingly, the first housing portion 30 includes a portion of each of the first wall 120, the third wall 128, and the fourth wall 132 and the second housing portion 38 includes a portion of each of the second wall 124, the third wall 128, and the fourth wall 132.

Figure 7:
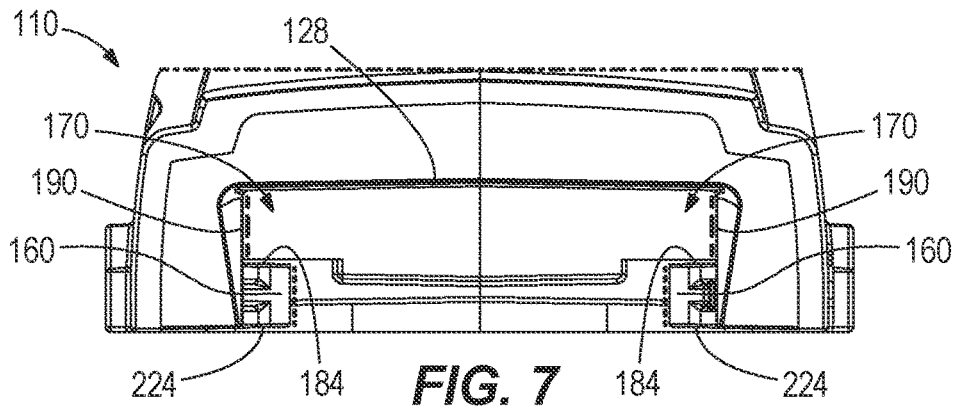
FIG. 7 is a front view of a battery pack receptacle according to one embodiment for the power tool of FIG. 1 and for use with the battery pack of FIG. 1.
Figure 24:
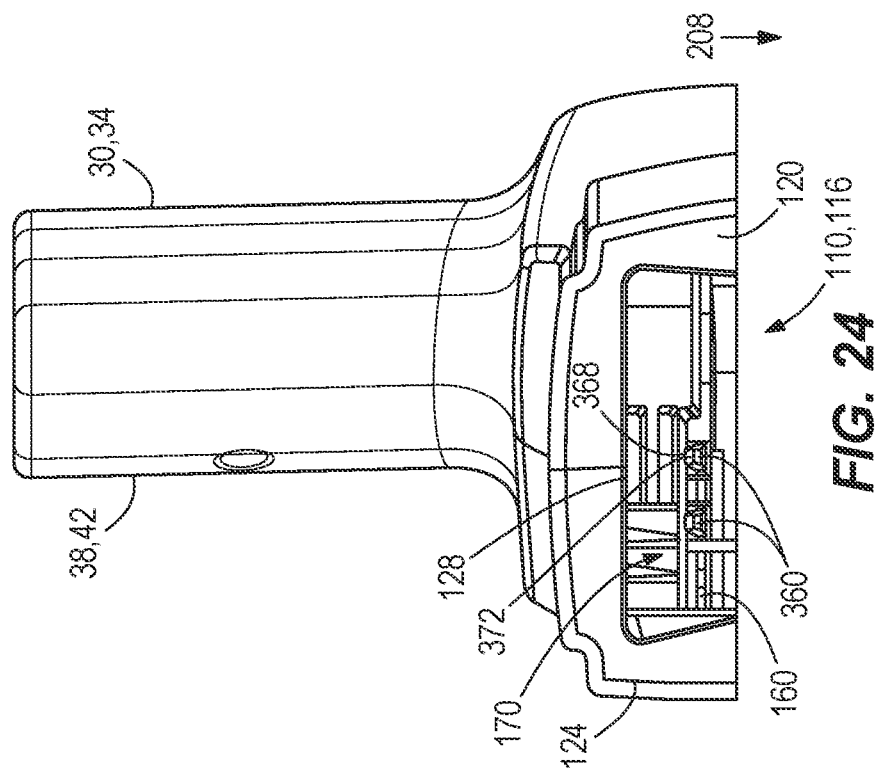
FIG. 24 is another perspective view of the battery pack receptacle of FIG. 23.
Figure 23:
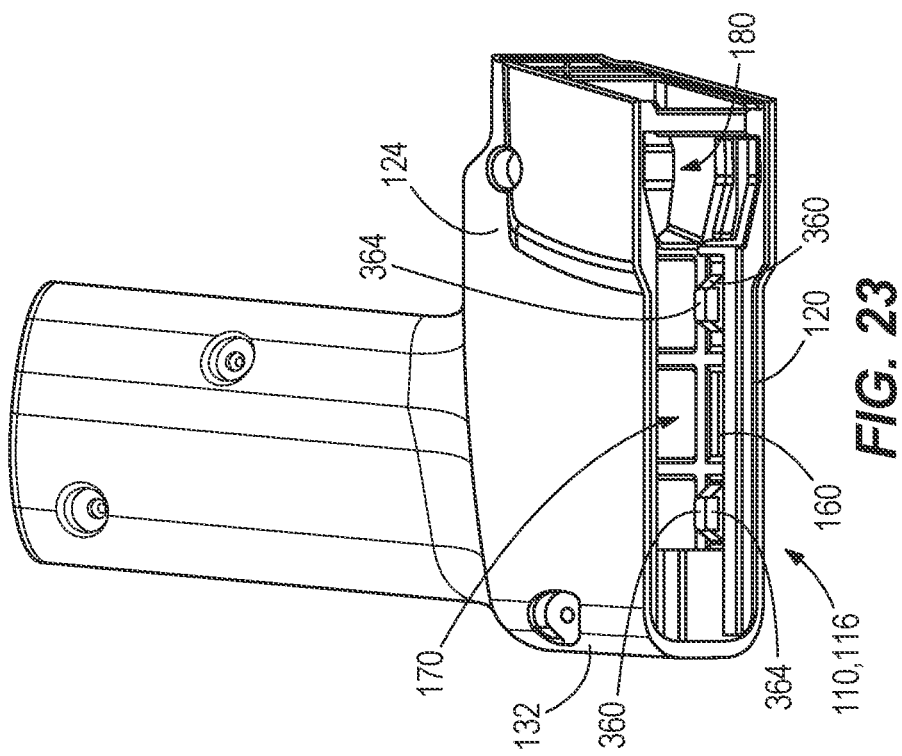
FIG. 23 is a perspective view of a battery pack receptacle according to one embodiment for power tool of FIG. 1 and useable with the battery pack of FIG. 1.
Figure 25:
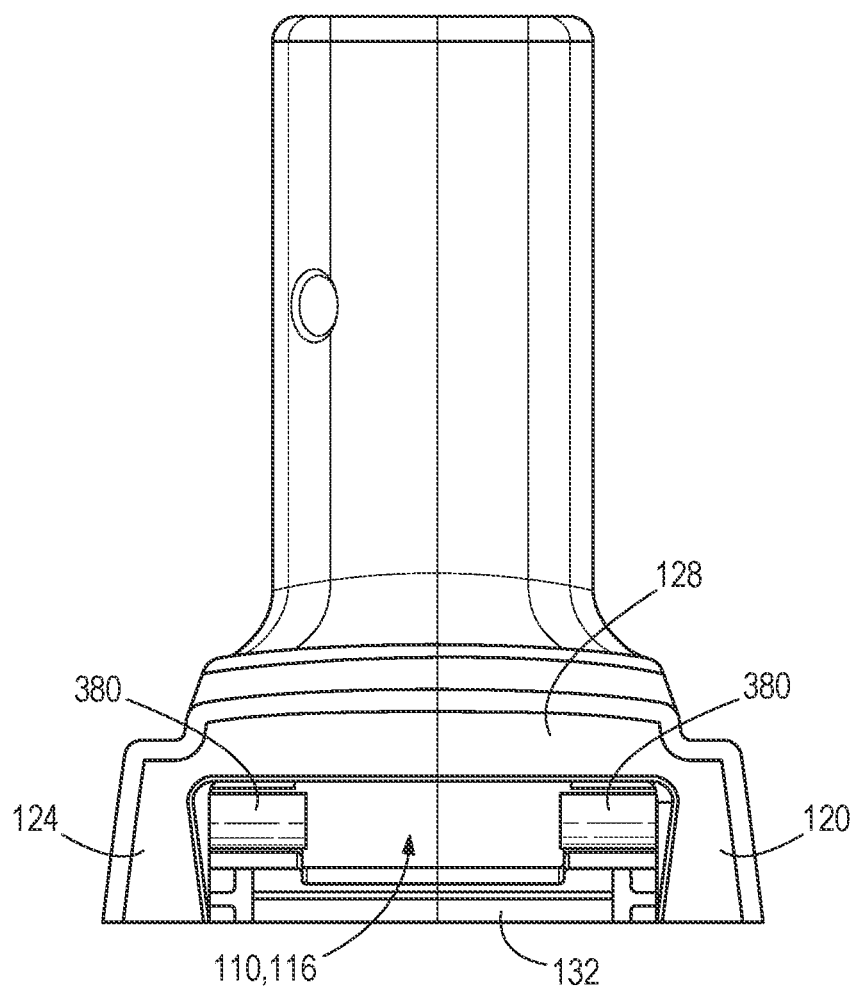
FIG. 25 is a front view of a battery pack receptacle according to one embodiment for the power tool of FIG. 1 and useable with the battery pack of FIG. 1.

Further with respect to FIGS. 7, 23, and 24, a first rail 160 is coupled to the first wall 120 and extends along at least a portion of a length between the insertion end and the closed end, and a second rail 160 is coupled to the second wall 124 and extends along at least a portion of a length between the insertion end and the closed end. A first groove 170 is defined between the first rail 160 and the third wall 128, and a second groove 170 is defined between the second rail 170 and the third wall 128. The first rail 160 of the power tool 10 is configured to be received within the first groove 78 of the battery pack 60, while the first groove 170 of the power tool is configured to receive the first rail 74 of the battery pack 60. The second rail 160 of the power tool 10 is configured to be received within the second groove 78 of the battery pack 60, while the second groove 170 of the power tool 10 is configured to receive a second rail 74 of the battery pack 60. Each of the first and second rails 160 defines a guide surface 184 (FIG. 7) for the respective rails 74 of the battery pack 60. With respect to FIG. 7 in particular, a first lateral wall 190 of the first groove 170 is positioned between the third wall 128 and the guide surface 184 of the first rail 160, and similarly, the second lateral wall 190 of the second groove is positioned between the third wall 128 and the guide surface 184 of the second rail 160. In the illustrated embodiment, each of the first and second lateral walls 190 are positioned at substantially perpendicular angles with respect to the third wall 128 and the guide surfaces 184 of the respective rails 160. The first wall 120 includes a first latch-receiving groove 180 (shown in FIGS. 4 and 23) configured to receive the first latch 90 and the second wall 124 includes a second latch-receiving groove 180 (shown in FIG. 4) configured to receive the second latch 90. In the illustrated embodiments, the first and second latch-receiving grooves 180 are positioned between the insertion end and the respective first and second rails 74.

Because power tools, such as that shown in FIGS. 1 and 2, are becoming more powerful and being used in harsher conditions, the connection between the power tool 10 and the battery pack 60 may deteriorate over time. In particular, vibration, shocks, and tool drops contribute to increased clearance between the battery pack 60 and the battery pack receptacle 110. FIGS. 4-25 illustrate battery pack receptacles 110 that improve the connection between the power tool and the battery pack 60 and increase the life of the power tool 10.

FIGS. 4-12 illustrate embodiments in which the contact surfaces between the battery pack receptacle 110 and the battery pack 60 help to reduce movement between the battery pack 60 and the battery pack receptacle 110.

Figure 5A:
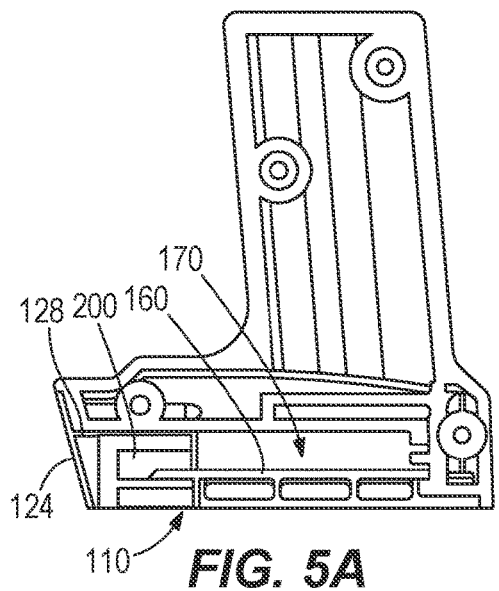
FIG. 5A is a side view of the battery pack receptacle of FIG. 4 with a portion of the battery pack receptacle removed.
Figure 5B:
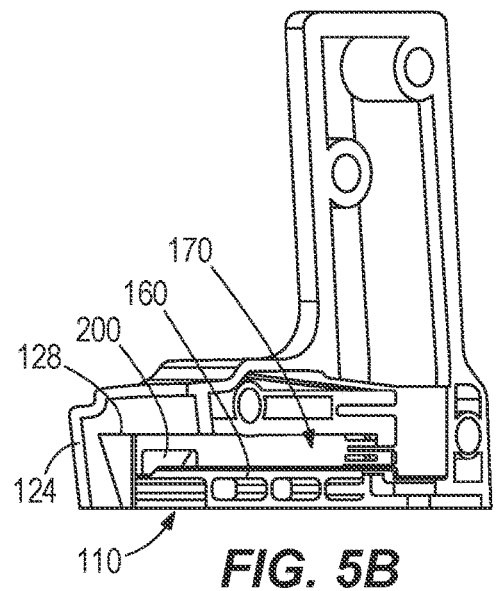
FIG. 5B is a perspective view of the battery pack receptacle of FIG. 5 with a portion of the battery pack receptacle removed.
Figure 6:
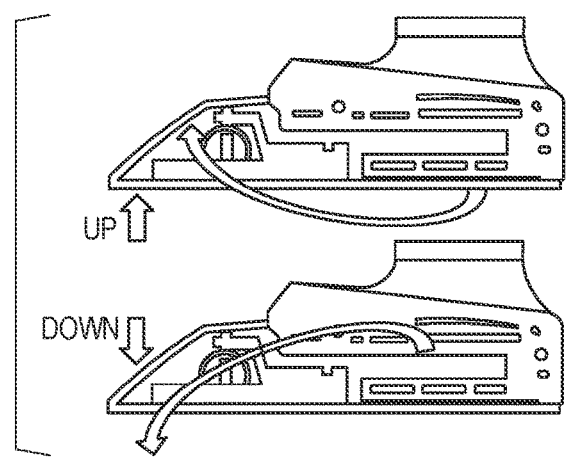
FIG. 6 shows the effect of the battery pack receptacle of FIGS. 4-5B on the movement of the battery pack relative to the battery pack receptacle.

In the embodiment of FIGS. 4-6, the battery pack receptacle 110 includes a first angled or tapered surface 200 and a second angled or tapered surface 200. The first angled surface 200 extends between the first wall 120 and the third wall 128, and the second angled surface 200 extends between the second wall 124 and the third wall 128. In the illustrated embodiment, each of the first and second angled surfaces 200 are positioned adjacent the respective first and second latch-receiving grooves 180. With respect to FIG. 4, each of the angled surfaces 200 defines a plane P1 that is oriented at a non-perpendicular and non-parallel (i.e., oblique) angle 204 relative to a plane P2 defined by the third wall 128. As shown, the first and second angled surfaces 200 are each positioned adjacent the insertion end such that they are configured to engage with the respective first and second latches 90 when the battery pack 60 is coupled to the battery pack receptacle 110. As the latches 90 move outward (e.g., away from the longitudinal axis A), each of the first and second angled surfaces 200 push the respective first and second latches 90 and the battery pack 60 itself in a first direction 208 (e.g., downwards), which increases friction between the battery pack 60 and tool rails 74, and thus reduces relative movement between the battery pack 60 and the power tool 10 during use. Specifically, and with respect to FIG. 6, the angled surfaces 200 of the battery pack receptacle 110 control the pitch (e.g., rotational movement about a horizontal axis) of the battery pack 60 relative to the battery pack receptacle 110.

Figure 8:
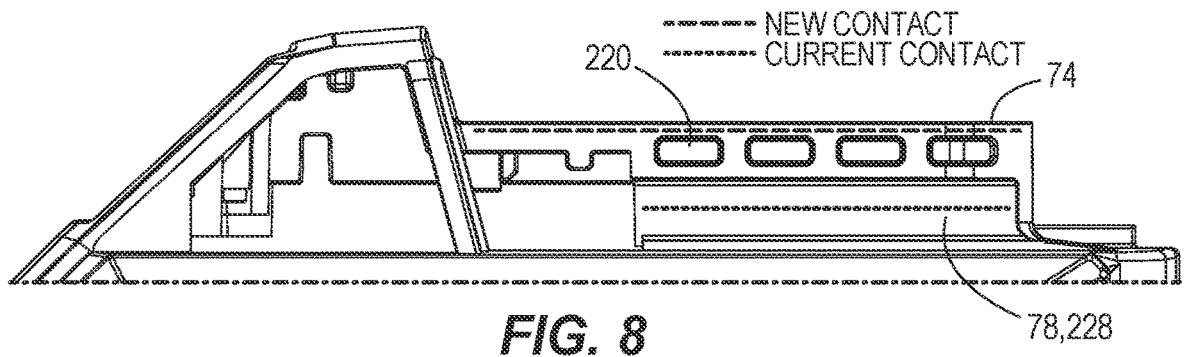
FIG. 8 is a schematic view of a portion of the battery pack of FIG. 1.
Figure 9:
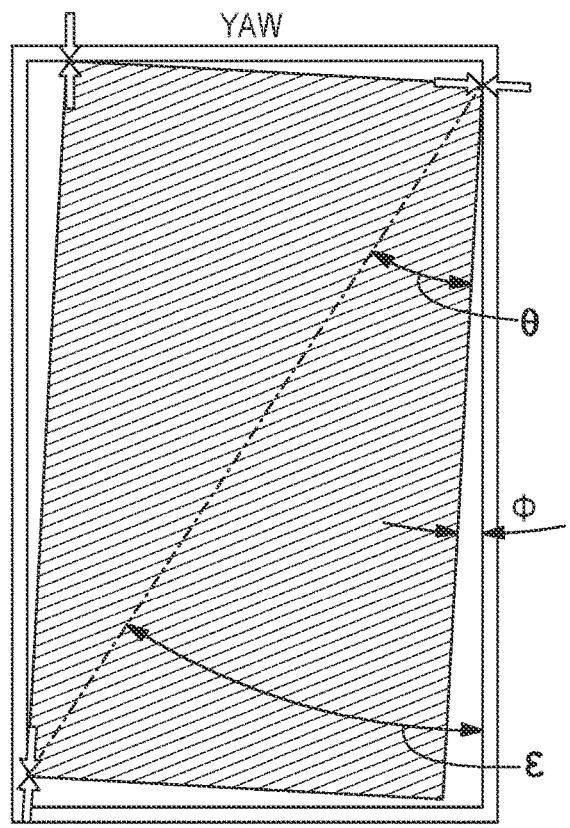
FIG. 9 shows the effect of the battery pack receptacle of FIG. 7 on the movement of the battery pack relative to the battery pack receptacle.

In the embodiments of FIGS. 7-9, the first and second grooves 170 of a battery pack receptacle 110 according to another embodiment are shown in greater detail. In particular, the first lateral wall 190 defines a first contact surface and the second lateral wall 190 defines a second contact surface. Each of the first and second lateral walls 190 of the groove 170 extend substantially the length of the respective groove 170. When the battery pack 60 is coupled to the power tool 10, the first contact surface of the first lateral wall 190 is configured to engage a first lateral wall 220 of the first rail 74 of the battery pack 60 and the second contact surface of the second lateral wall 190 is configured to engage a second lateral wall (not shown) of the second rail 74 of the battery pack 60. Each of the first and second lateral walls 190 of the groove 170 extend substantially the length of the respective first and second lateral walls 220 of the rails 74 of the battery pack 60. The first and second contact surfaces contrast conventional contact surfaces between the battery pack receptacle 110 and the battery pack 60. That is, as shown in FIGS. 7-8, traditionally, the lateral walls 224 of each of the first rails 160 of the battery pack receptacle 110 contact the lateral walls 228 of the first and second grooves 78 of the battery pack 60. However, by making the contact surfaces between the lateral walls 190 of the grooves 170 of the battery pack receptacle 110 and the lateral walls 220 of the rails 74 of the battery pack 60, the yaw movement (e.g., rotational movement about a vertical axis) of the battery pack 60 relative to the battery pack receptacle 110 can be reduced (FIG. 9). This is because the length of engagement between lateral walls 190 of the grooves 170 of the battery pack receptacle 110 and the lateral walls 220 of the battery pack rails 74 is increased as compared to the length of engagement between the lateral walls 224 of the rails 160 of the battery pack receptacle 110 and the lateral walls 228 of the battery pack grooves 78.

Figure 10:
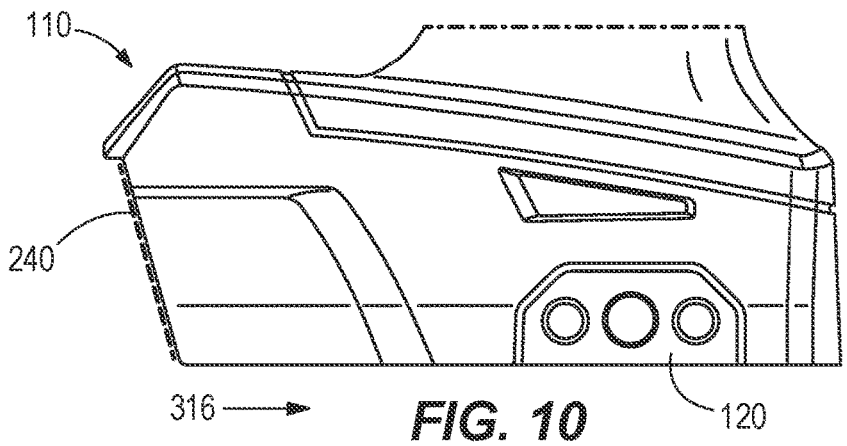
FIG. 10 is a side view of a battery pack receptacle according one embodiment for the power tool of FIG. 1 and for use with the battery pack of FIG. 1.
Figure 11:
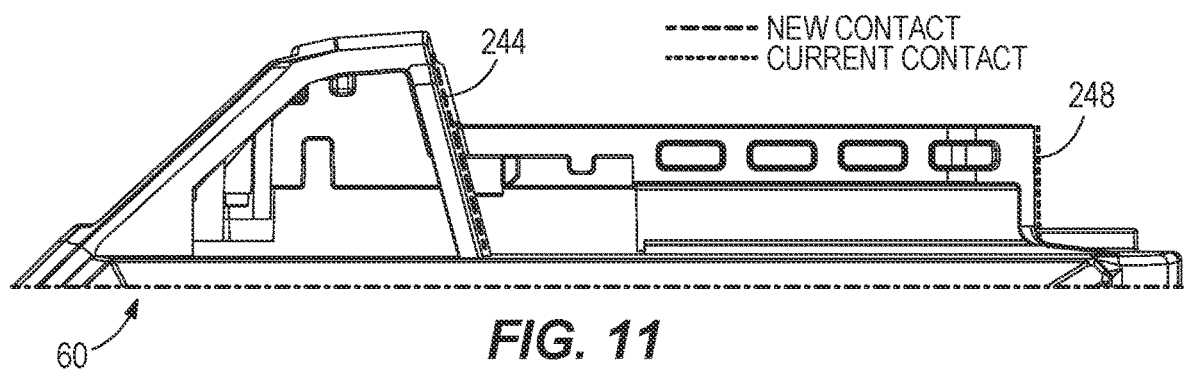
FIG. 11 is a side view of a schematic of a portion of the battery pack of FIG. 2.
Figure 12:
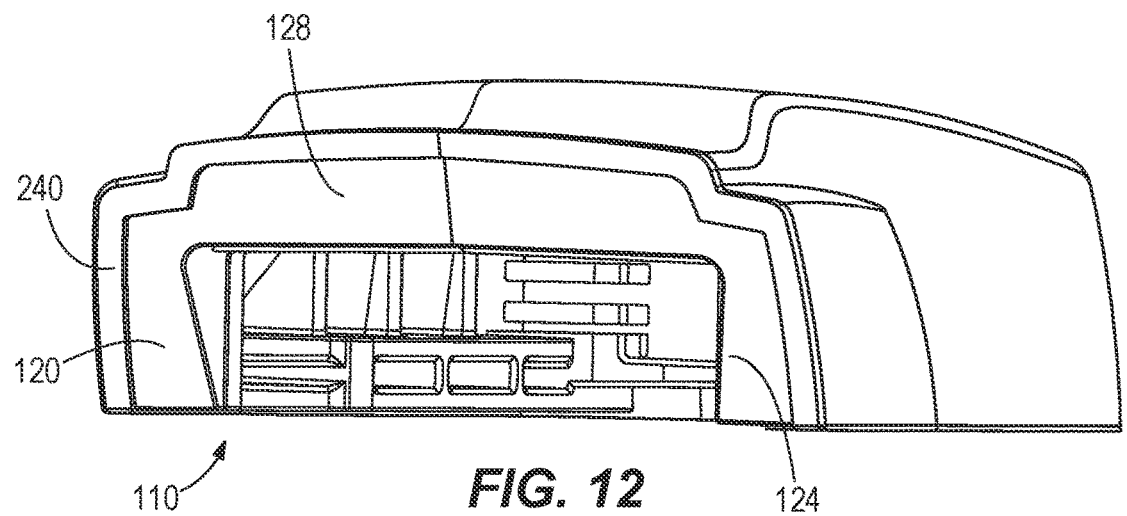
FIG. 12 shows a contact surface of the battery pack receptacle that contacts a contact surface of the battery pack of FIG. 2.
Figure 16:
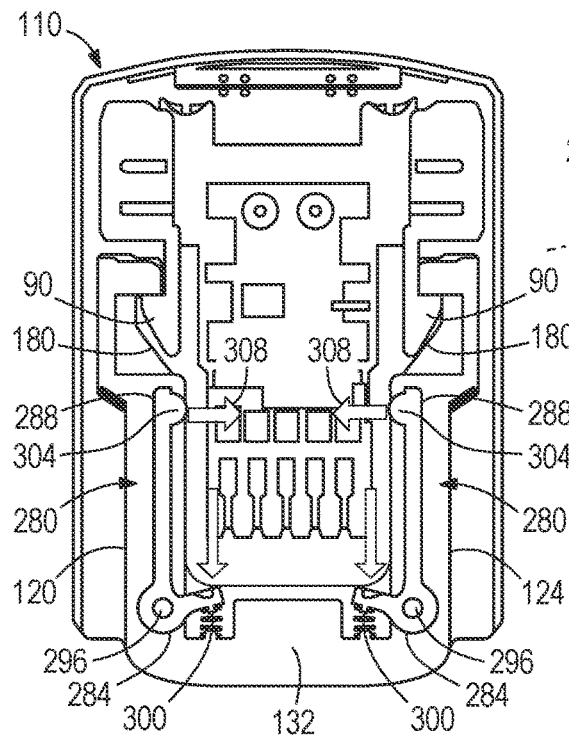
FIG. 16 is a cross-sectional view of a battery pack receptacle according to one embodiment for the power tool of FIG. 1 and useable with the battery pack of FIG. 1, the cross-section being taken along the ling 16-16 of FIG. 1 and including a wedge.
Figure 17:
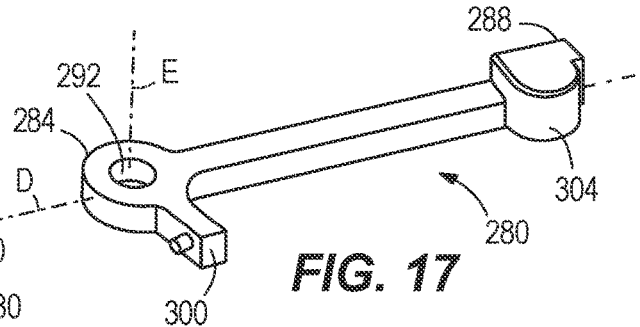
FIG. 17 is a perspective view of the wedge of FIG. 16.
Figure 18:
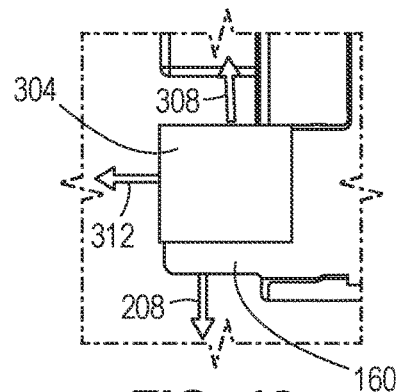
FIG. 18 is a detailed view of the wedge of FIG. 16.
Figure 19:
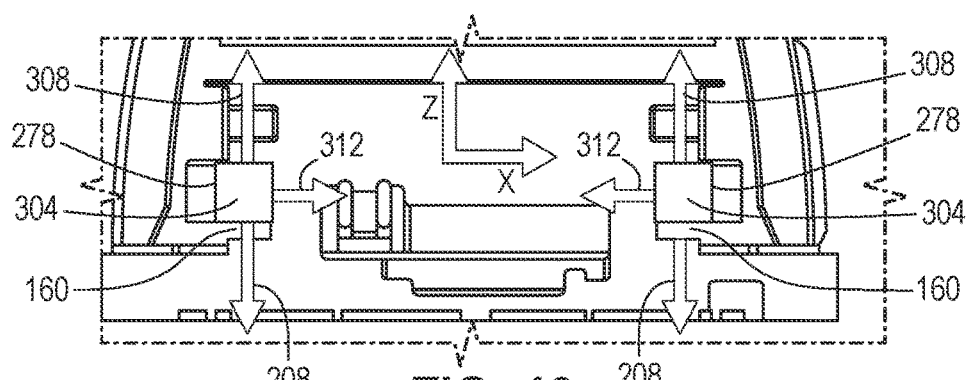
FIG. 19 is a detailed view of the receptacle of FIG. 16.
Figure 20:
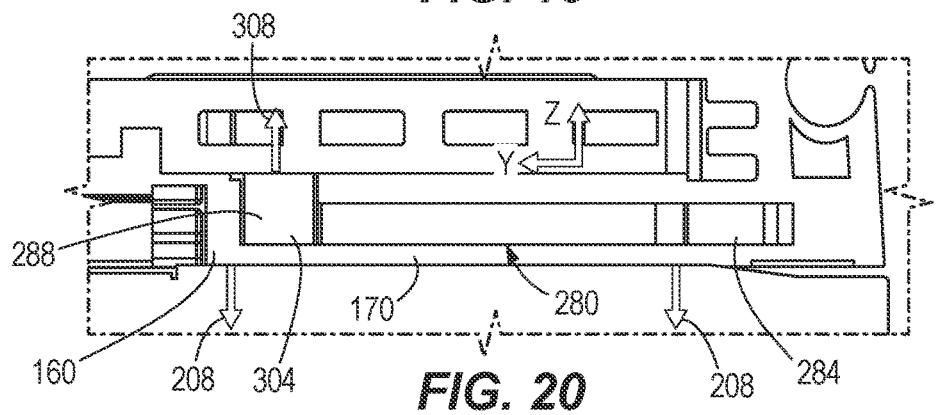
FIG. 20 is another detailed view of the battery pack receptacle of FIG. 16.

In the embodiments of FIGS. 10-12, a battery pack receptacle 110 according to another embodiment is shown in greater detail. In particular, as shown in FIG. 10, the insertion end of the battery pack receptacle 110 defines a contact surface or face 240. That is, the contact surface 240 is defined by a portion of each of the first wall 120, the second wall 124, and the third wall 128 that make up the insertion end. When the battery pack 60 is coupled to the power tool 10, the contact surface 244 of the insertion end is configured to engage a contact surface 244 of the battery pack 60 that is adjacent a front end of the battery pack 60. In particular, the contact surface 244 of the battery pack 60 is adjacent the latch 90, the latch actuators 94, or both. Defining the contact surface 240 at the insertion end of the power tool 10 contrasts conventional contact between the battery pack receptacle 110 and the battery pack 60. That is, as shown in FIG. 11, traditionally, the contact surface (not shown) of the battery pack receptacle 110 is adjacent the fourth wall 132 of the battery pack receptacle 110 (e.g., at the closed end of the battery pack receptacle 110) such that the rear of the battery pack 60 defines the mating contact surface 248. However, by making the contact surface 240, 244 between the insertion end of the battery pack receptacle 110 and the battery pack 60, the fore-aft movement along arrow 316 (e.g., movement parallel to the insertion axis B) of the battery pack 60 relative to the battery pack receptacle 110 can be reduced. This is because a larger radius is defined from an axis of rotation but the same linear distance is maintained thereby decreasing the potential angle of rotation.

FIGS. 13-25 illustrate embodiments in which the battery pack receptacles 110 each include an auxiliary mechanism positioned within or adjacent the battery pack receptacle 110 that reduces movement between the battery pack 60 and the battery pack receptacle 110.

In the embodiments of FIGS. 13-20, the battery pack receptacle 110 includes one or more movable (e.g., pivotable) levers 250, 280. In the embodiment illustrated in FIGS. 13-15, the one or more levers 250 are adjacent the insertion end and configured to engage the latches 90. As shown, a first lever 250 is movably (e.g., pivotably) coupled adjacent the first wall 120 and a second lever 250 is movably (e.g., pivotably) coupled adjacent the second wall 124. The first lever 250 is positioned in or adjacent the first latch-receiving groove 180 and the second lever 250 is positioned in or adjacent the second latch-receiving groove 180. Each of the first and second levers 250 has a body that has a first leg 254 and a second leg 258 that intersects the first leg 254. The first leg 254 and the second leg 258 of each of the first and second levers 250 intersect at a non-parallel angle, which in the illustrated embodiment is a perpendicular angle or an acute angle. The first lever 250 is pivotably coupled to either the first wall 120 or the third wall 128 by a first pin 262, and the second lever 250 is pivotable coupled to either the second wall 124 or the third wall 128 by a second pin 262. The first pin 262 and the second pin 262 each extend through an area adjacent the intersection between the respective first and second legs 254, 258, and define an axis C about which the respective lever 250 is pivotable. Although not shown, each of the first and second levers 250 may include a biasing mechanism (e.g., a spring).

Each of the levers 250 is movable between a first position in which the respective first leg 254 is spaced apart from the respective first and second wall 120, 124 by a first distance and a second position in which the first leg 254 is spaced apart from the respective first and second wall 120, 124 by a second distance that is less than the first distance. In some embodiments, the first leg 254 may in fact be in contact with the respective first and second wall 120, 124 in the second position. Regardless, the first leg 254 is closer to the respective first and second wall 120, 124 in the second position than in the first position. Moreover, as shown, the levers 250 pivot in opposite directions as they move between the first position and the second position. That is, when viewed from the insertion end of the battery pack receptacle 110, the first lever 250 moves counterclockwise about the axis C and the second lever 250 moves clockwise about the axis C.

When the battery pack 60 is inserted into the battery pack receptacle 110 and the latches 90 move outward (e.g., away from the insertion axis) into the respective first and second latch-receiving grooves 180, the latches 90 move the respective first and second levers 250 from the first to the second position. Additionally, as the latches 90 move outward and the levers 250 move from the first position to the second position, the second leg 258 of each of the levers 250 presses down onto a top wall or surface 266 of the battery pack 60 to secure the power tool to the battery pack 60. Specifically, as the first latch 90 moves outward, the first lever 250 moves (e.g., pivots) counterclockwise about the axis C such that the leg 258 of the first lever 250 presses down onto a top wall or surface 266. Similarly, as the second latch 90 moves outward, the second lever 250 moves (e.g., pivots) clockwise about the axis C such that the second leg 258 of the second lever 250 presses in the first direction 208 (e.g., downwards) onto the top wall or surface 266.

In the embodiment of FIGS. 16-20, the battery pack receptacle 110 has one or more levers 280 that are adjacent the closed end and configured to engage opposite sides of the battery pack 60. As shown, a first lever 280 is movably (e.g., pivotably) coupled adjacent the first wall 120 and a second lever 280 is movably (e.g., pivotably) coupled adjacent the second wall 124. In the illustrated embodiment, at least a portion of each of the levers 280 may be positioned in and supported by an opening 278 that extends along the length of each of the rails 160 of the battery pack receptacle 110. Each of the first and second levers 280 includes a body that has a first end 284 (e.g., coupling end), a second end 288 (e.g., clamping end) that is opposite the first end 284, and longitudinal axis D extends between the first end 284 and the second end 288. As shown, for each of the levers 280, the first end 284 is positioned adjacent the closed end (e.g., the fourth wall 132) and the second end 288 is positioned between the closed end and the insertion end. An aperture 292 extends through each of the first ends 284 of the first and second levers 280 and receives a pin 296. The pin 296 movably or pivotably couples the respective lever 280 to the battery pack receptacle 110 and defines a pivot axis E (which is into the page in FIG. 16 and shown relative to the aperture 292 in FIG. 17) such that second end 288 is movable or pivotable relative to the first end 284 about the pivot axis E. A projection 300 extends from each of the first ends 284 towards the insertion axis B. The projection 300 is positioned at a non-parallel angle (e.g., a perpendicular or acute angle) relative to the longitudinal axis D of the body. A wedge 304 is positioned adjacent the second end 288. The wedge 288 projects away from the body in at least two directions—towards the insertion axis B and towards the third wall 128. Although not shown, each of the first and second levers 280 may include a biasing mechanism (e.g., a spring).

Each of the levers 280 is movable between a first position and a second position. For each lever 280, in the first position, the projection 296 is positioned relative to the fourth wall 132 by a first distance and the respective second end 288 is positioned relative to the respective first and second wall 120, 124 by a second distance. For each of the levers 280, in the second position, the projection 296 is positioned relative to the fourth wall 132 by a third distance that is less than the first distance and the respective second end 288 is positioned relative to the respective first and second wall 120, 124 by a fourth distance that is greater than the third distance. In other words, the projections 296 move toward the fourth wall 132 as the levers 280 move from the first position and the second position and the projections 296 move away from the fourth wall 132 as the levers 280 return to the first position from the second position. Similarly, the second ends 288 of the levers 288 move away the respective first and second walls 120, 124 as the levers 132 move from the first position and the second position and the second ends 288 of the levers 280 move toward the respective first and second walls 120, 124 as the levers 280 return to the first position from the second position. Moreover, as shown, the levers 280 pivot in opposite directions as they move between the first position and the second position. That is, when viewed from above the battery pack receptacle 110, the first lever 280 moves clockwise about the axis E and the second lever 250 moves counterclockwise about the axis E.

As the battery pack 60 is inserted into the battery pack receptacle 110, the rear of the battery pack 60 engages the projections 300 on the first ends 284 of the levers 280, which causes the levers 280 to move from the first position to the second position. When the levers 280 are in the second position, the wedges 304 at the second ends 288 of the levers 280 exert forces in a first direction 208 (e.g., a downward direction), a second direction 308 (e.g., an upward direction), and a third direction 312 (e.g., towards the insertion axis B). The forces in the first, second, and third directions 208, 308, 312 assist in engaging the rails 74 and grooves 78 of the battery pack 60. Moreover, the levers 280 generally exert a force in a fore-aft direction 316 (e.g., a fourth direction of the battery pack receptacle 110), which assists in positively engaging the levers with the respective latches 90. Accordingly, when the battery pack 60 is secured to the battery pack receptacle 110 the levers 280 exert a clamping force on the battery pack 60 in four directions such that the connection between the battery pack 60 and the battery pack receptacle 110 is tighter thereby eliminating movement therebetween.

Figure 22:
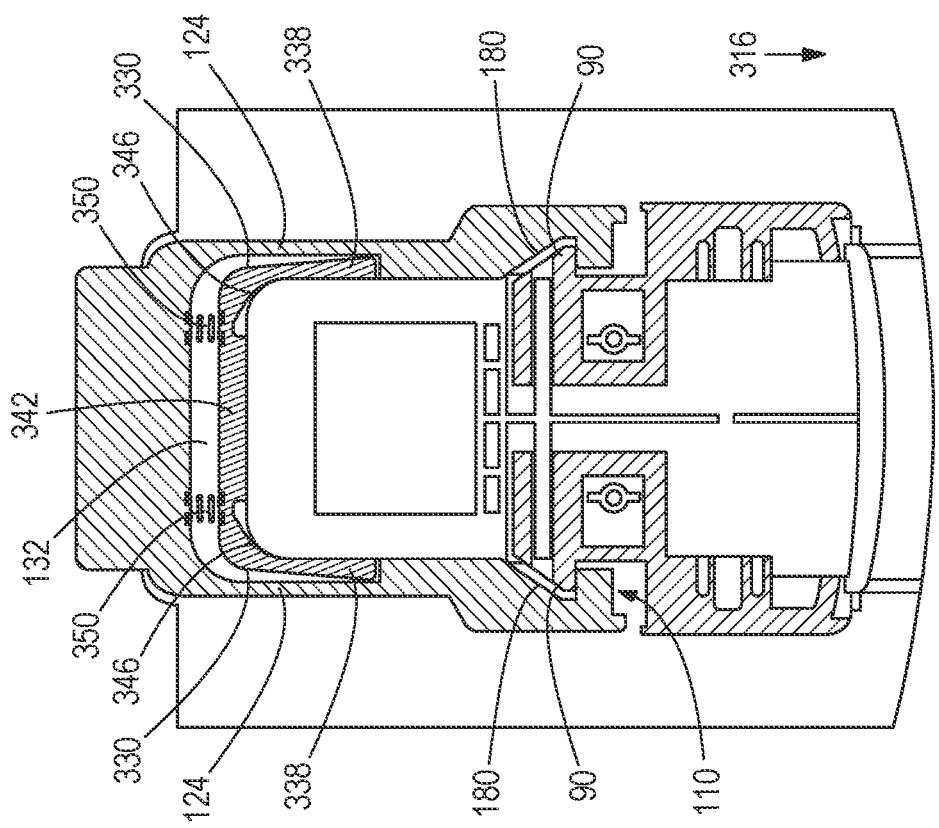
FIG. 22 is a front view of the battery pack receptacle of FIG. 21.
Figure 21:
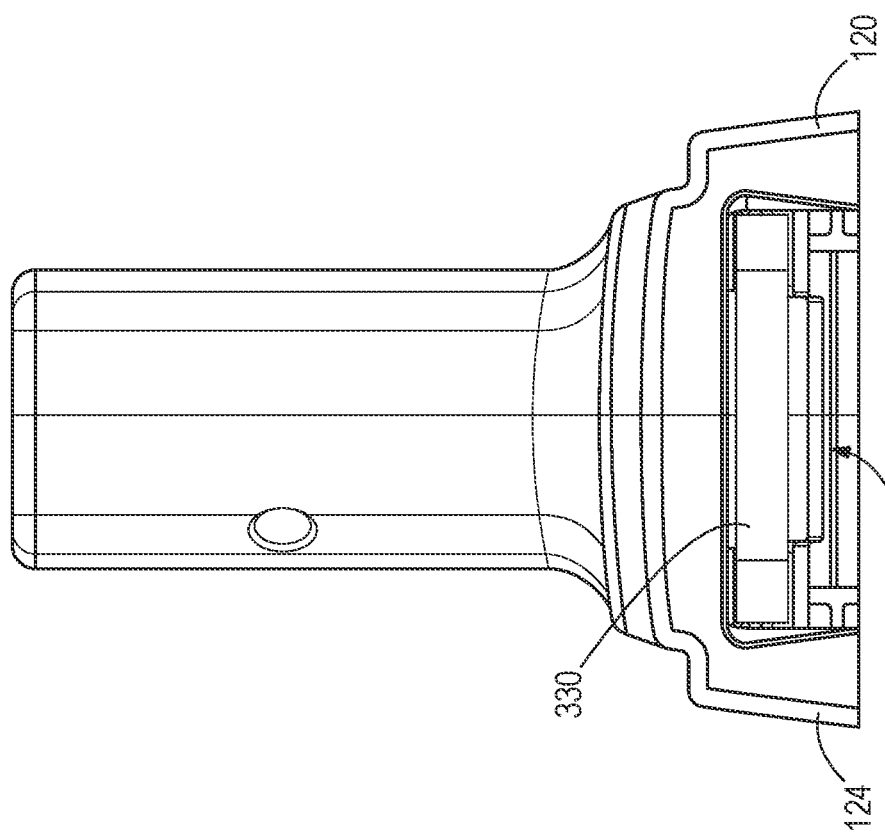
FIG. 21 is a cross-sectional view of a battery pack receptacle according to one embodiment for the power tool of FIG. 1 and useable with the battery pack of FIG. 1, the cross-section being taken along the ling 13-13 of FIG. 1.

In the embodiment of FIGS. 21-22, an insert 330 is position within and movable relative to the battery pack receptacle 110. In particular, a substantially U-shaped insert 330 is positioned adjacent the closed end (e.g., the fourth wall 132) of the battery pack receptacle 110. The U-shaped insert 330 includes a first member 334 and a second member 338 coupled by an intermediate member 342. The first member 334 is positioned adjacent the first wall 120 and the second member 338 is positioned adjacent the second wall 124. A tapered surface or pocket 346 is defined between the first member 334 and the intermediate member 342 and between the second member 338 and the intermediate member 342. One or more biasing mechanisms 350 (e.g., springs) are coupled between insert 330 and the battery pack receptacle 110, and specifically, between the intermediate member 342 and the fourth wall 132. In the illustrated embodiment, two springs 350 are used to couple the intermediate member 342 to the fourth wall 132. In other embodiments, there may be a single spring 350 or more than two springs 350. The springs 350 bias the insert 330 away from the fourth wall 132 and into the cavity 116. When the battery pack 60 is inserted into the battery pack receptacle 110, the rear end of the battery pack 60 engages the insert 330 and the springs 350 are compressed. In particular, the rear end of the battery pack 60 engages the intermediate member 342 while the opposite sides of the rear end of the battery pack 60 engage the respective first and second members 334, 338. The insert 330 and springs 350 eliminate fore-aft (e.g., forward and rearward movement) of the battery pack 60 relative to the battery pack receptacle 110. In particular, the springs 350 exert a force on the insert 330, which in turn exerts a force on the battery pack 60, such that the latches 90 are forced in the fourth or fore-aft direction 316 (e.g., towards the insertion end) and against a surface of the respective latch-receiving grooves 180. The tapered surfaces 346 of the insert 330 increase retention as the battery pack 60 is inserted into the battery pack receptacle 110. That is, the fit gets tighter as the battery pack 60 is pushed further into the cavity 116. The continuous body of the insert 330 ensures proper point of contact on the battery pack 60 and conceals the springs 350 from the cavity 116.

In the embodiment of FIGS. 23 and 24, the battery pack receptacle 110 includes one or more deflectable or elastic beams or tabs 360. In the illustrated embodiment, each beam 360 is coupled to (e.g., integrally formed with or otherwise coupled to) and extends from the respective first and second wall 120, 124 of the battery pack receptacle 110 inwardly (e.g., towards the insertion axis B) such that a free end of each of the beams 360 is spaced apart from the respective first and second wall 120, 124. Additionally, each of the beams 360 is positioned in and extends through openings 364 in the respective first and second rails 160. The beams 360 also each include a first tapered surface 368 and a second tapered surface 372 that intersects the first tapered surface 368. Each of the first and second tapered surfaces 368, 372 extend into the respective groove 170 of the battery pack receptacle 110 such that a portion of each of the beams 360 is raised with respect to the guide surface 184 of the respective rail 160. In the illustrated embodiment, there are two beams 360 on each side of the battery pack receptacle 110, which are spaced apart from one another along the length of the rail 160. The beams 360 may be formed from any suitable elastic or deflectable material, such as plastic or metal. As the battery pack 60 is inserted into the battery pack receptacle 110, contact surfaces of the rails 74 of the battery pack 60 engage the beams 360. The first tapered surface 368 allows the battery pack rail 74 to slide over the beam 360 and depress or deflect it in a first direction 208 (e.g., downwardly or away from the third wall 128) when the battery pack 60 is inserted into the battery pack receptacle 110. Similarly, the second tapered surface 372 allows the battery pack rail 74 to slide over the beam 360 and depress or deflect it in a first direction 208 (e.g., downwardly or away from the third wall 128) when the battery pack 60 is removed from the battery pack receptacle 110. When the battery pack 60 is coupled to the battery pack receptacle 110, the beam 360 exerts force in a second direction opposite the first direction 208 (e.g., upwardly or towards the third wall 128) to create an interference fit and eliminate clearance between the battery pack 60 and the battery pack receptacle 110 thereby improving the fit therebetween.

In the embodiment of FIG. 25-28, the battery pack receptacle 110 includes one or more elastic members or slugs 380. In the embodiment illustrated in FIGS. 25-27C, a first slug 380 is coupled to and extends from the first wall 120 of the battery pack receptacle 110 inwardly (e.g., towards the insertion axis B) such that a free end of first slug 380 is spaced apart from the first wall 120, and a second slug 380 is coupled to and extends from the second wall 124 of the battery pack receptacle 110 inwardly (e.g., towards the insertion axis B) such that a free end of second slug 380 is spaced apart from the second wall 124. in the illustrated embodiment, the first and second slugs 380 are positioned adjacent the closed end of the battery pack receptacle 110 (e.g., adjacent the fourth wall 132). The slugs 380 are made of rubber in the illustrated embodiment but may be made from other elastic and/or deformable materials in other embodiments. When the battery pack 60 is coupled to the battery pack receptacle 110, each of the first and second slugs 380 may compress laterally and take up any gap between the rear of the battery pack 60 and the closed end of the battery pack receptacle 110. Accordingly, the first and second slugs 380 create an interference fit (e.g., force) and eliminate clearance between the battery pack 60 and the battery pack receptacle 110 thereby improving the fit therebetween. Specifically, the first and second slugs 380 may eliminate fore-aft movement (e.g., forward and rearward movement) of the battery pack 60 relative to the battery pack receptacle 110.

Figure 26A:
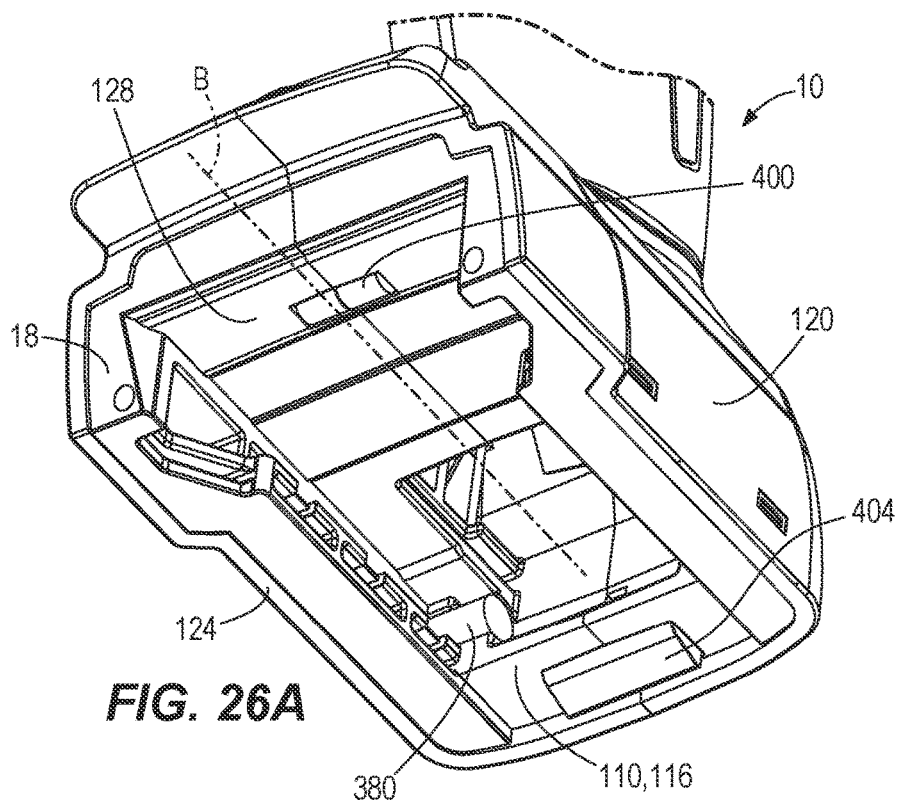
FIG. 26A is a perspective view of a battery pack receptacle according to one embodiment for the power tool of FIG. 1 and useable with the battery pack of FIG. 1.
Figure 26B:
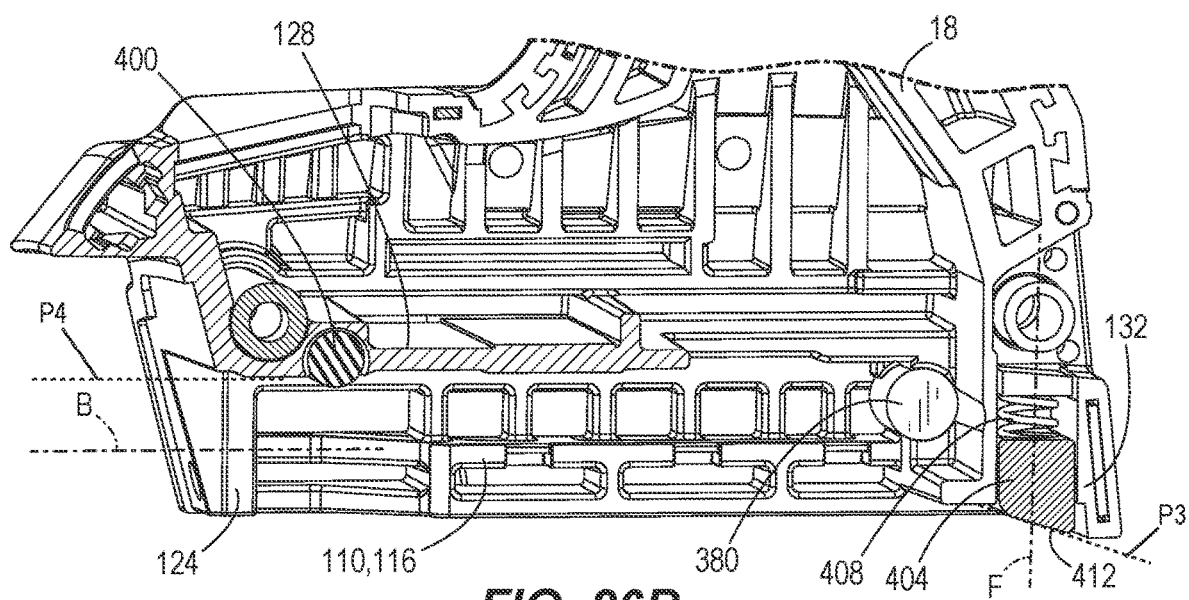
FIG. 26B is a cross-sectional view of the battery pack receptacle of FIG. 26A along an insertion axis.

In some embodiments, such as that of FIGS. 26A and 26B, the battery pack receptacle 110 may further include an elastic member 400 extending from the third wall 128 adjacent the insertion end of the cavity 116 and an elastic member 404 (e.g., an insert or ramp) extending from the third wall 128 at or adjacent the closed end of the cavity 116. The elastic member 404 is positioned adjacent the fourth wall 132 in the illustrated embodiment. In the illustrated embodiment, the elastic member 400 is substantially stationary while the elastic member 404 is movable. That is, the elastic member 404 is movable relative to the receptacle 110 via a spring 408 (FIG. 26B), which is oriented along an axis F that is perpendicular to the insertion axis B. The spring 408 biases the elastic member 404 downward toward the battery pack 60, when attached. Additionally, the elastic member 404 defines an angled or tapered surface 412. The angled surface 412 defines a plane P3 that is oriented at a non-parallel and non-perpendicular angle (e.g., an oblique angle) relative to a plane P4 defined by the third wall 128. The elastic members 400, 404 both engage top surfaces of the battery pack 60 to provide a downward force thereon and further reduce movement of the battery pack 60 relative to the receptacle 110. In the illustrated embodiment, the elastic members 400, 404 are constructed from rubber but may be constructed from other materials in other embodiments. In the illustrated embodiment, the elastic member 404 is positioned between the slugs 380 when viewed from the front of the tool 10 but is closer to the closed end of the receptacle 110 than the slugs 380. That is, the slugs 380 are positioned between the elastic members 400, 404.

Figure 27A:
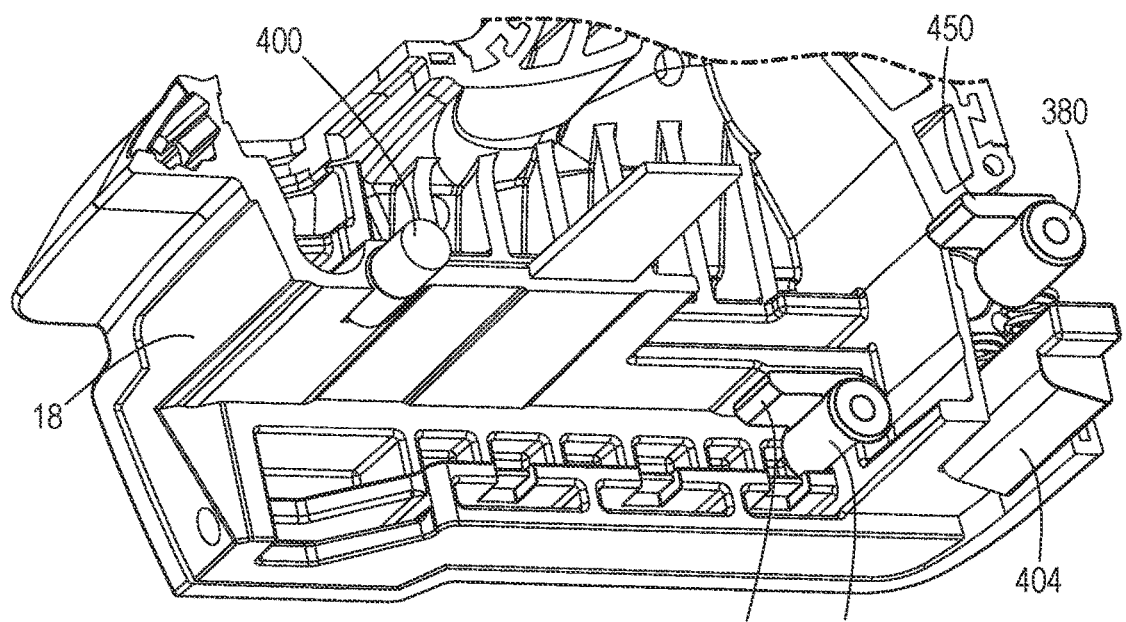
FIG. 27A is a perspective view of a battery pack receptacle according to one embodiment for the power tool of FIG. 1 and useable with the battery pack of FIG. 1.
Figure 27B:
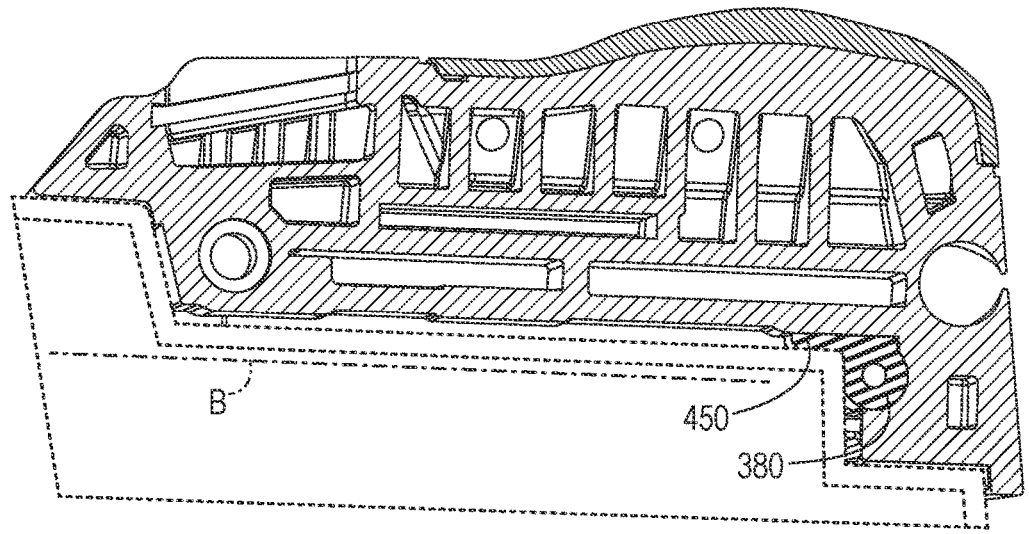
FIG. 27B is a cross-sectional view of the battery pack receptacle of FIG. 27A along an insertion axis.
Figure 27C:
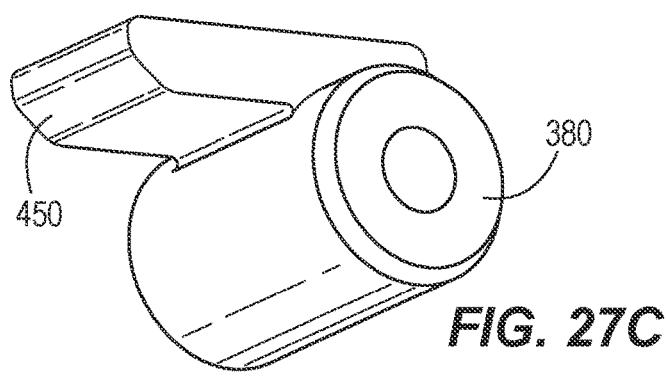
FIG. 27C is a perspective view of an elastic member of the battery pack receptacle of FIG. 27A.
Figure 28:
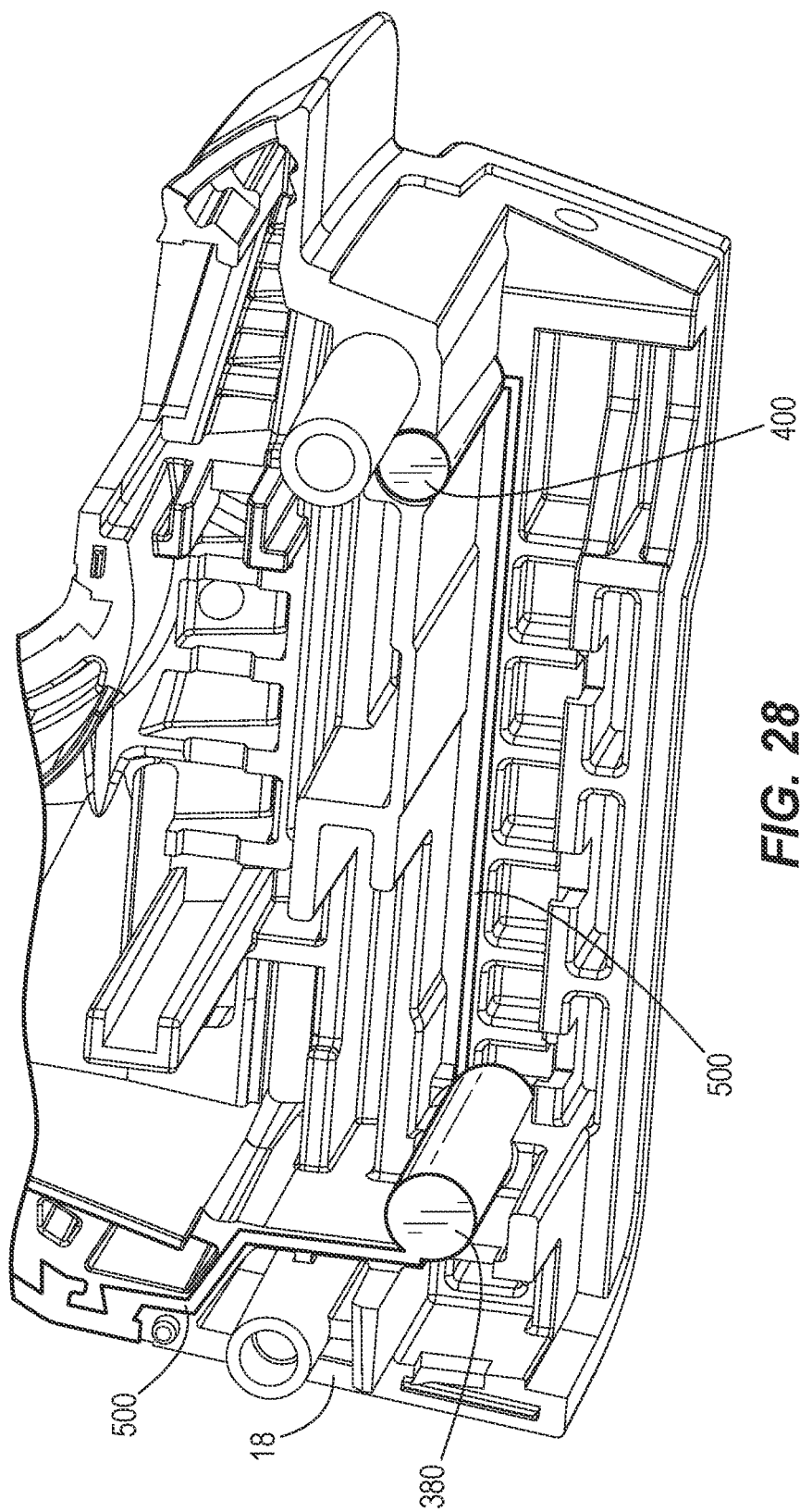
FIG. 28 is a perspective view of a battery pack receptacle according to one embodiment for the power tool of FIG. 1 and useable with the battery pack of FIG. 1.

In the embodiment of FIGS. 27A-27C, the first and second slugs 380 include a projection 450 extending therefrom. The projection 450 extends parallel to the insertion axis from the respective slug 380 towards the insertion end. The projections 450 of the first and second slugs 380, like the spring-biased elastic member 404, engage top surfaces of the battery pack 60 to provide a downward force thereon and further reduce movement of the battery pack 60 relative to the receptacle 110. The slugs 380 having the projections 450 are used with the elastic members 400, 404 in FIGS. 27A-27C, although in other embodiments one or both of the elastic members 400, 404 may be omitted.

While the slugs 380 and elastic member 400 are coupled to the receptacle 100 in the embodiments of FIGS. 25-27A, the slugs 380 and the elastic member 400 are coupled to the receptacle in other suitable ways. For example, the slugs 380 and the elastic member 400 may be molded (e.g., injection molded) with the housing 18 of the tool 10 in other embodiments. That is, the material of the slugs 380 and elastic member 400 may be introduced into and positioned relative to the housing 18 via channels 500.

Although the present subject matter has been described in detail with reference to certain embodiments, variations and modifications exist within the scope of one or more independent aspects of the present subject matter, as described. Various features are set forth in the following claims.

What is claimed is:

1. A power tool battery pack receptacle comprising:
    a cavity in which a portion of a battery pack is receivable, the cavity defined in part by a first wall, a second wall, and an intermediate wall coupled between the first wall and the second wall;
    an insertion end;
    a closed end opposite the insertion end along an insertion axis of the battery pack;
    a rail coupled to the first wall and extending between the insertion end and the closed end, the rail defining a guide surface;
    a groove defined between the intermediate wall and the guide surface of the rail, the groove having a lateral wall coupled between the intermediate wall and the guide surface of the rail; and
    a tapered contact surface extending between the intermediate wall and the first wall, the tapered contact surface configured to engage a latch of the battery pack to tighten a connection between the battery pack and the battery pack receptacle, and
    wherein, when the latch is in a locking position to secure the battery pack to the battery pack receptacle, the tapered contact surface pushes the latch away from the intermediate wall in a direction perpendicular to the insertion axis.

2. The power tool battery pack receptacle of claim 1, wherein the tapered contact surface defines a plane that is positioned at an oblique angle relative to a plane defined by the intermediate wall.

3. The power tool battery pack receptacle of claim 1, wherein the tapered contact surface is positioned adjacent the insertion end.

4. The power tool battery pack receptacle of claim 1, wherein the tapered contact surface controls a pitch of the battery pack.

5. The power tool battery pack receptacle of claim 1, further comprising a lateral contact surface that is the lateral wall of the groove, and wherein the lateral wall of the groove is configured to engage a lateral wall of a rail of the battery pack.

6. The power tool battery pack receptacle of claim 5, wherein the lateral contact surface has a length that is substantially the same as a length of the lateral wall of the rail of the battery pack.

7. The power tool battery pack receptacle of claim 5, wherein when the lateral contact surface of the lateral wall of the groove engages the lateral wall of the rail of the battery pack, yaw movement of the battery pack relative to the battery pack receptacle is reduced.

8. The power tool battery pack receptacle of claim 1, further comprising a contact surface that is at the insertion end and configured to engage a contact surface of the battery pack that is adjacent a latch, a latch actuator, or both the latch and the latch actuator of the battery pack.

9. The power tool battery pack receptacle of claim 8, wherein when the contact surface at the insertion end engages the contact surface of the battery pack, fore-aft movement of the battery pack along the insertion axis of the battery pack is reduced.

10. A power tool comprising:
   a housing including a handle and a battery pack receptacle, the battery pack receptacle including
      a cavity in which a portion of a battery pack is receivable, the cavity defined in part by a first wall, a second wall, and an intermediate wall coupled between the first wall and the second wall,
      an insertion end and a closed end opposite the insertion end along an insertion axis of the battery pack,
      a rail coupled to the first wall and extending between the insertion end and the closed end, the rail defining a guide surface,
      a groove defined between the intermediate wall and the guide surface of the rail, the groove having a lateral wall coupled between the intermediate wall and the guide surface of the rail, and
      means positioned within or adjacent the cavity for engaging and exerting a force on a latch of the battery pack when the latch is in a locking position to secure the battery pack to the battery pack receptacle to push a portion of the battery pack away from the intermediate wall in a direction perpendicular to the insertion axis to tighten a connection between the battery pack and the battery pack receptacle.

11. The power tool of claim 10, wherein the means positioned with or adjacent the cavity for engaging and exerting a force on a latch of the battery pack to tighten the connection between the battery pack and the battery pack receptacle includes a lever positioned adjacent the insertion end and pivotally coupled adjacent the first wall.

12. The power tool of claim 10, wherein the means positioned with or adjacent the cavity for engaging and exerting a force on a latch of the battery pack to tighten the connection between the battery pack and the battery pack receptacle includes a tapered contact surface extending between the intermediate wall and the first wall, the tapered contact surface configured to engage the latch of the battery pack to tighten a connection between the battery pack and the battery pack receptacle, wherein, when the latch is in a locking position to secure the battery pack to the battery pack receptacle, the tapered contact surface pushes the latch away from the intermediate wall in a direction perpendicular to the insertion axis.

13. The power tool of claim 12, wherein the tapered contact surface defines a plane that is positioned at an oblique angle relative to a plane defined by the intermediate wall.

14. The power tool of claim 12, further comprising a latch-receiving groove configured to receive the latch, the tapered contact surface positioned adjacent the latch-receiving groove.

15. The power tool of claim 11, further comprising a latch-receiving groove configured to receive a latch of the battery pack, the lever being positioned in or adjacent the latch-receiving groove.

16. The power tool of claim 11, wherein the lever is pivotable about an axis that extends substantially parallel to the insertion axis.

17. The power tool of claim 11, wherein the lever includes a first leg that intersects a second leg at a perpendicular angle or acute angle, and wherein, when the latch is in a locking position to secure the battery pack to the battery pack receptacle, the first leg engages the latch, and the second leg exerts a clamping force on a top surface of the battery pack.

18. The power tool battery pack receptacle of claim 1, further comprising a latch-receiving groove configured to receive the latch, the tapered contact surface positioned adjacent the latch-receiving groove.

19. The power tool battery pack receptacle of claim 18, wherein the latch of the battery pack is a first latch and the tapered contact surface is a first tapered contact surface, and
further comprising a second tapered contact surface extending between the intermediate wall and third wall, the tapered contact surface configured to engage a second latch of the battery pack to tighten a connection between the battery pack and the battery pack receptacle, and
wherein, when the second latch is in a locking position to secure the battery pack to the battery pack receptacle, the second tapered contact surface pushes the second latch away from the intermediate wall in a direction perpendicular to the insertion axis.

20. The power tool battery pack receptacle of claim 19, further comprising
   a first latch-receiving groove configured to receive the first latch, the first tapered contact surface positioned adjacent the first latch-receiving groove, and
   a second latch-receiving groove configured to receive the second latch, the second tapered contact surface positioned adjacent the second latch-receiving groove.

* * * * *